United States Patent
Cline et al.

(10) Patent No.: US 10,436,122 B2
(45) Date of Patent: Oct. 8, 2019

(54) FUEL-AIR RATIO CONTROL OF GAS TURBINE ENGINES

(71) Applicant: Rolls-Royce North American Technologies, Inc., Indianapolis, IN (US)

(72) Inventors: Curtis H. Cline, Brownsburg, IN (US); Richard J. Skertic, Carmel, IN (US); Russell E. White, Jr., Greenwood, IN (US); Steven D. Phillips, Avon, IN (US)

(73) Assignee: Rolls-Royce North American Technologies, Inc., Indianapolis, IN (US)

( * ) Notice: Subject to any disclaimer, the term of this patent is extended or adjusted under 35 U.S.C. 154(b) by 1005 days.

(21) Appl. No.: 14/680,369

(22) Filed: Apr. 7, 2015

(65) Prior Publication Data

US 2016/0010567 A1    Jan. 14, 2016

Related U.S. Application Data

(60) Provisional application No. 61/977,896, filed on Apr. 10, 2014.

(51) Int. Cl.
*F02C 9/28* (2006.01)
*F02C 9/50* (2006.01)
(Continued)

(52) U.S. Cl.
CPC .............. *F02C 9/28* (2013.01); *F02C 3/04* (2013.01); *F02C 7/04* (2013.01); *F02C 7/232* (2013.01);
(Continued)

(58) Field of Classification Search
CPC ...... F02C 9/28; F02C 9/48; F02C 9/50; F02C 3/04; F02C 7/04; F02C 7/232; F02C 7/32; F23R 3/26; F23R 3/28; F05D 2220/30; F05D 2220/76; F05D 2240/35; F05D 2260/903; F05D 2270/02; F05D 2270/04;
(Continued)

(56) References Cited

U.S. PATENT DOCUMENTS 3,921,390 A    11/1975   Stoltman
3,977,182 A    8/1976    Schroff
(Continued)

FOREIGN PATENT DOCUMENTS

DE    69810671 T2    11/2003

OTHER PUBLICATIONS

Search Report for EP Application No. 15162649.6, dated Jul. 28, 2015, 3 pp.

*Primary Examiner* — Thai Ba Trieu
*Assistant Examiner* — Loren C Edwards
(74) *Attorney, Agent, or Firm* — Fishman Stewart PLLC

(57) ABSTRACT

A turbine engine includes a fan connected to a fan shaft, a combustion chamber, and an electric motor/generator in communication with the fan shaft. A controller is configured to direct power into the electric motor/generator during engine accelerations from steady state such that air flow to the combustion chamber is increased. The controller is further configured to direct power out of the electric motor/generator during engine decelerations from steady state such that air flow to the combustion chamber is decreased.

20 Claims, 3 Drawing Sheets

(51) Int. Cl.
*F02C 3/04* (2006.01)
*F02C 7/04* (2006.01)
*F02C 7/232* (2006.01)
*F02C 7/32* (2006.01)
*F23R 3/26* (2006.01)
*F23R 3/28* (2006.01)

(52) U.S. Cl.
CPC .................. *F02C 7/32* (2013.01); *F02C 9/50* (2013.01); *F23R 3/26* (2013.01); *F23R 3/28* (2013.01); *F05D 2220/30* (2013.01); *F05D 2220/76* (2013.01); *F05D 2240/35* (2013.01); *F05D 2260/903* (2013.01); *F05D 2270/02* (2013.01); *F05D 2270/04* (2013.01); *F05D 2270/07* (2013.01); *F05D 2270/112* (2013.01); *F05D 2270/304* (2013.01); *F05D 2270/335* (2013.01)

(58) Field of Classification Search
CPC ........... F05D 2270/07; F05D 2270/112; F05D 2270/304; F05D 2270/335

USPC ................................ 60/801, 802, 39.27, 240
See application file for complete search history.

(56) References Cited

U.S. PATENT DOCUMENTS

| | | |
|---|---|---|
| 4,178,754 A | 12/1979 | Earnest |
| 4,442,668 A | 4/1984 | Conn |
| 5,133,182 A | 7/1992 | Marcos |
| 5,907,949 A | 6/1999 | Falke et al. |
| 7,188,475 B2 | 3/2007 | McGinley et al. |
| 8,468,835 B2 | 6/2013 | DeMoss et al. |
| 2006/0150633 A1* | 7/2006 | McGinley ............... F02C 7/275 60/773 |
| 2006/0225431 A1* | 10/2006 | Kupratis ................. F01D 15/10 60/791 |
| 2010/0058731 A1 | 3/2010 | Haehner et al. |
| 2012/0000204 A1 | 1/2012 | Kesseli et al. |
| 2013/0133332 A1 | 5/2013 | MacFarlane |

* cited by examiner

FUEL-AIR RATIO CONTROL OF GAS TURBINE ENGINES

CROSS-REFERENCE TO RELATED APPLICATIONS

This application claims priority to U.S. Provisional Patent Application No. 61/977,896, filed Apr. 10, 2014, the contents of which are hereby incorporated in their entirety.

FIELD OF TECHNOLOGY

An improved integrated design and control of a gas turbine is disclosed. More particularly, performance and efficiency are improved by optimizing the fuel-air ratio during operation of the gas turbine engine. The improvements are applicable to turbines used for propulsive power in marine, land, air, and underwater applications, as examples.

BACKGROUND

It has become increasingly desirable to improve the overall system design and operation of gas turbines. In a system having a typical gas turbine engine, electrical power is extracted via an electrical generator to supply electrical power to control systems, actuators, weapons systems, climate control systems, and the like. Electrical storage, such as a battery, is typically provided to operate such systems when the gas turbine engine is not running or to provide power for starting the gas turbine engine. In some known gas turbine engines, the gas turbine engine includes a high pressure shaft and a lower pressure shaft, and the electrical generator is coupled to one of the high and low pressure shafts.

Acceleration or deceleration of the gas turbine engine is commonly accomplished by increasing or decreasing the fuel flow into the engine. The increased fuel speeds up the generator shaft, which in turn increases the air flow for combustion. This can generate inefficiencies in the fuel-air-ratio as there is a lag between fuel increase and the respective increase in air flow. In addition, this process may result in temperature spikes and increased combustion chamber temperatures during acceleration.

Overcoming these concerns would be desirable and could decrease fuel consumption, reduce gas turbine generator wear, and improve the operating efficiency of gas turbine generators.

BRIEF DESCRIPTION OF THE DRAWINGS

While the claims are not limited to a specific illustration, an appreciation of the various aspects is best gained through a discussion of various examples thereof. Referring now to the drawings, exemplary illustrations are shown in detail. Although the drawings represent the illustrations, the drawings are not necessarily to scale and certain features may be exaggerated to better illustrate and explain an innovative aspect of an example. Further, the exemplary illustrations described herein are not intended to be exhaustive or otherwise limiting or restricted to the precise form and configuration shown in the drawings and disclosed in the following detailed description. Exemplary illustrations are described in detail by referring to the drawings as follows:

DETAILED DESCRIPTION

An exemplary gas turbine engine and schematic of an electrical system coupled thereto are described herein and are shown in the attached drawings. The electrical system includes at least two generator circuits, one coupled to a high pressure portion of a gas turbine engine and the other coupled to a low pressure portion of the gas turbine engine.

Figure 1:
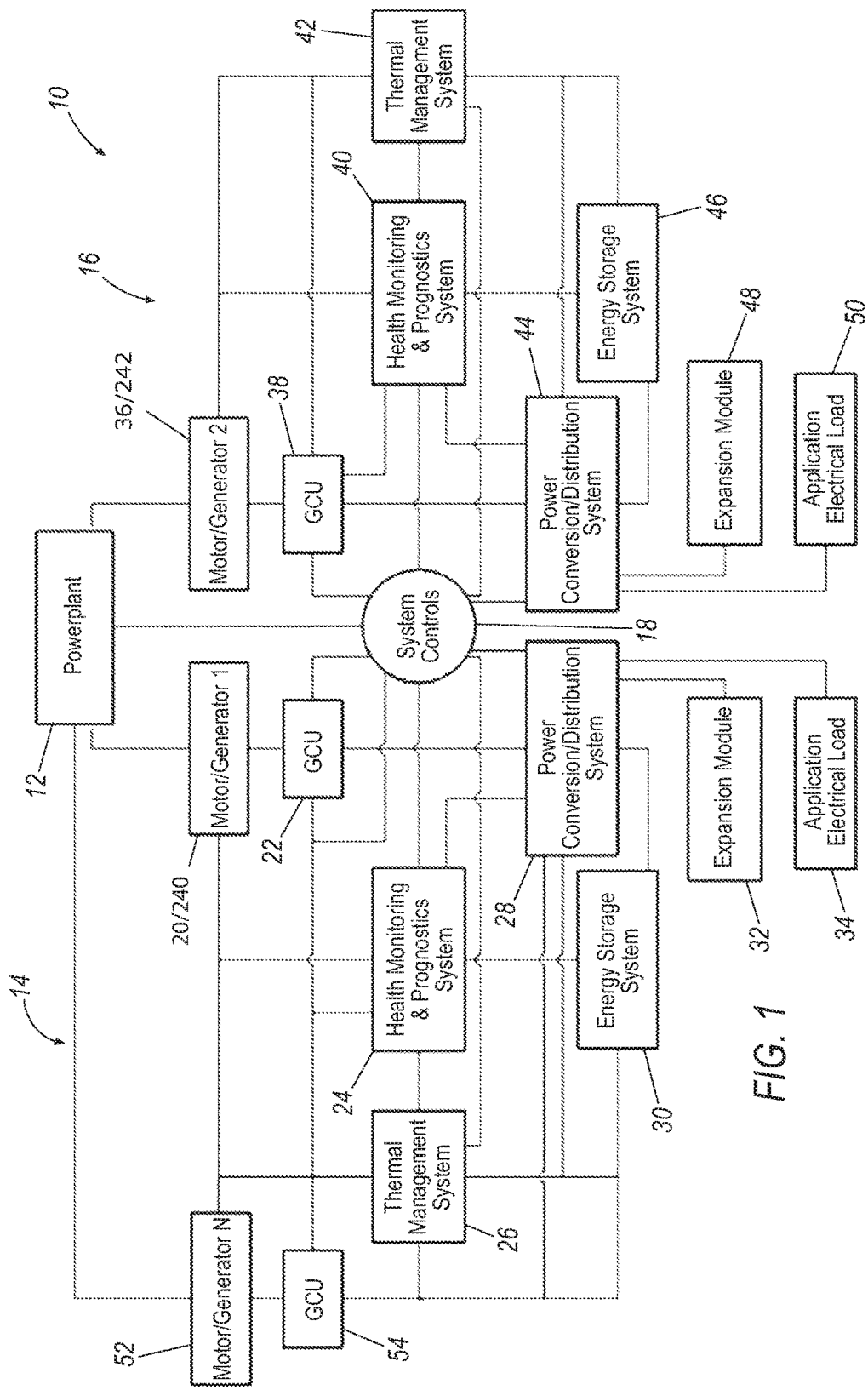
FIG. 1 is a schematic illustration of an electrical system coupled to a gas turbine engine, according to one example.

FIG. 1 illustrates an electrical system 10 in which a power plant or engine 12, such as a gas turbine engine, provides electrical power to a first power circuit 14 and a second power circuit 16. A system controller 18 is coupled to engine 12 and also to first and second circuits 14, 16. First power circuit 14 includes a main motor/generator 20 and a General Control Unit (GCU) 22 coupled thereto. GCU 22 is also coupled to other components within first power circuit 14, such as a health monitoring and prognostics system 24, a thermal management system 26, and a power conversion/distribution system 28. First power circuit 14 also includes an energy storage system 30, an expansion module 32, and application electrical load(s) 34. System controller 18 is configured to regulate power flow (such as electrical currents and voltages within system 10) to provide power to various electrical busses. The power may be DC, AC, or conversion therebetween. System controller 18 may also be configured to execute computer program instructions to control the operation of engine 12, including fuel flow, or the position of any variable geometry systems (e.g., from the flight control system of an aircraft or from a steering system of a ship).

Health monitoring and prognostics system 24 is generally a unit that monitors the health of system components, and may be used to estimate component life based on sensor feedback received from components within engine 12. Thermal management system 26 includes pumps, expansion valves, and the like, as well as a controller, to provide coolant for the purposes of climate control, and other system operations. Power conversion/distribution system 28 receives electrical power from main motor/generator 20 via GCU 22, and converts the power to a more useable form such as a DC voltage for storage in energy storage system 30, expansion module 32, and application electrical load(s) 34. The energy storage system 30 may include a battery or other energy storage system. Energy storage system 30 stores energy for providing power when engine 12 is not running (i.e., not generating power), but also to provide power to main motor/generator 20 to provide starting power to engine 12 during startup. Expansion module 32 and application electrical load 34 represent additional electrical components that receive power from power conversion/distribution system 28.

Second power circuit 16 similarly includes a main motor/generator 36 and a GCU 38 coupled thereto. GCU 38 is also coupled to other components within second power circuit 16, such as a health monitoring and prognostics system 40, a thermal management system 42, and a power conversion/distribution system 44. Second power circuit 16 also includes an energy storage system 46, an expansion module 48, and application electrical load(s) 50. The components 36-50 of second power circuit 16 are similarly arranged as described with respect to first power circuit 14. Additionally, in one example electrical system 10 includes one or more additional main motor/generators 52 and corresponding GCUs 54 as well, which may be coupled to a gas turbine engine as will be further described. Thus, the system 10 is modular and flexible in that it may be expanded to include a number N of main motor/generators based on contemplated operating conditions.

Figure 2:
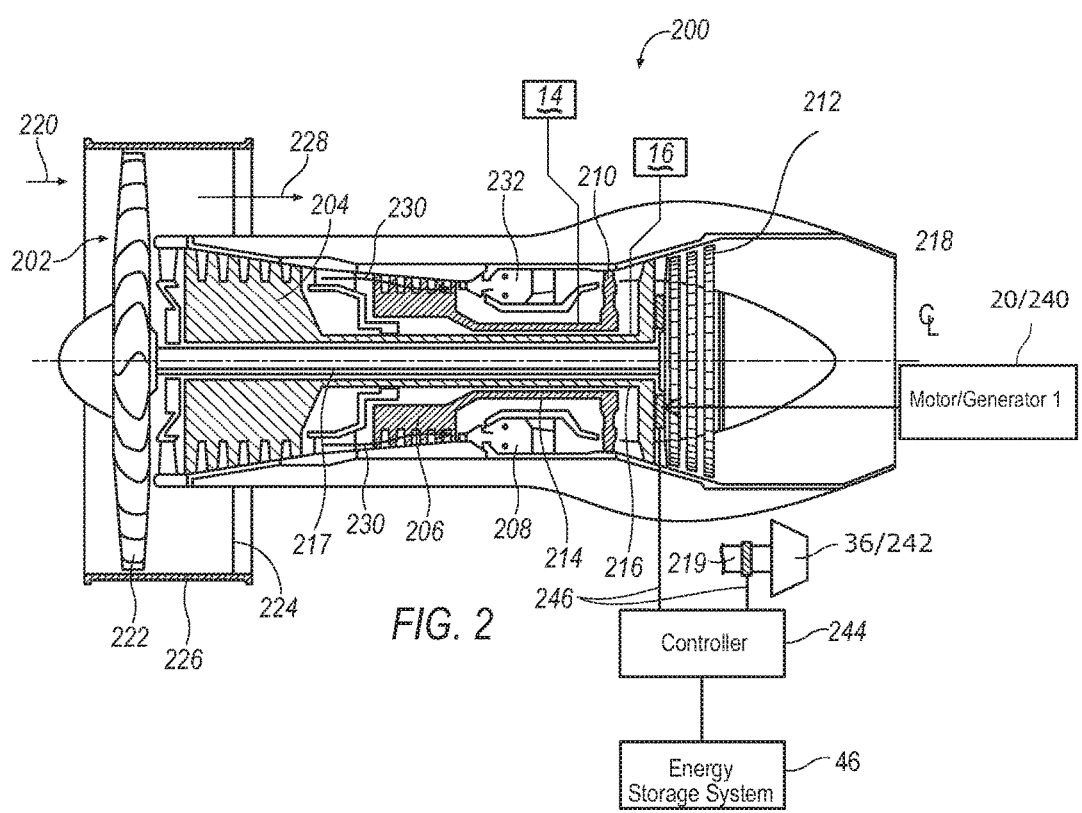
FIG. 2 illustrates an exemplary gas turbine engine that incorporates the electrical system illustrated in FIG. 1.

FIG. 2 illustrates a gas turbine engine 200, which includes a fan 202, a intermediate pressure compressor and a high pressure compressor, 204 and 206, a combustor (combustion chamber) 208, and a high pressure turbine and intermediate pressure turbine, 210 and 212, respectively. The high pressure compressor 206 is connected to a first rotor shaft 214 while the intermediate pressure compressor 204 is connected to a second rotor shaft 216. The fan 202 is connected to a fan shaft 217 also referred to as a low pressure shaft. The shafts extend axially and are parallel to a longitudinal center line axis 218. Ambient air 220 enters the fan 202 and is directed across a fan rotor 222 in an annular duct 224, which in part is circumscribed by fan case 226. Bypass airflow 228 provides engine thrust while a primary gas stream 230 is directed to a combustor 232 and the high pressure turbine 210.

The first rotor shaft 214 and the fan shaft 217, are coupled, respectively, to first and second power circuits 14, 16, as illustrated in FIG. 1. The fan/low pressure shaft 217 is coupled with the gas generator shaft 219 of main motor/generator 36. The first and second power circuits 14, 16 are configured to split power between main motor/generators 20, 36 so that each provides a portion of the power demand. As such, a power sharing/transfer arrangement between main motor/generators 20, 36 provides the platform power demand, and includes a capability to provide power to one of the shafts 214, 217, as necessary. Such arrangement also provides an ability to optimize load shedding and a demand side management of the power requirement. Thus, life and performance considerations may be taken into account in real-time and optimized to actively seek and obtain performance optima while equipment is in operation.

The fan shaft 217 is coupled to a first motor/generator 240 and to the gas generator shaft 219. A second motor/generator 242 is coupled to the gas generator shaft 219. The first motor/generator 240 and the second motor/generator 242 are in communication with a controller 244 through one or more platform electrical busses 246. It is contemplated that the present disclosure may include the first motor generator 240, the second motor generator 242, or both. The controller 244 may be contained within the system controls 18, the GCU 38, as a module within any power controller, or may be an independent control system. It is contemplated that the controller 244 is in communication with the energy storage system 46 in order to direct stored energy into or away from the energy storage system 46.

Figure 3:
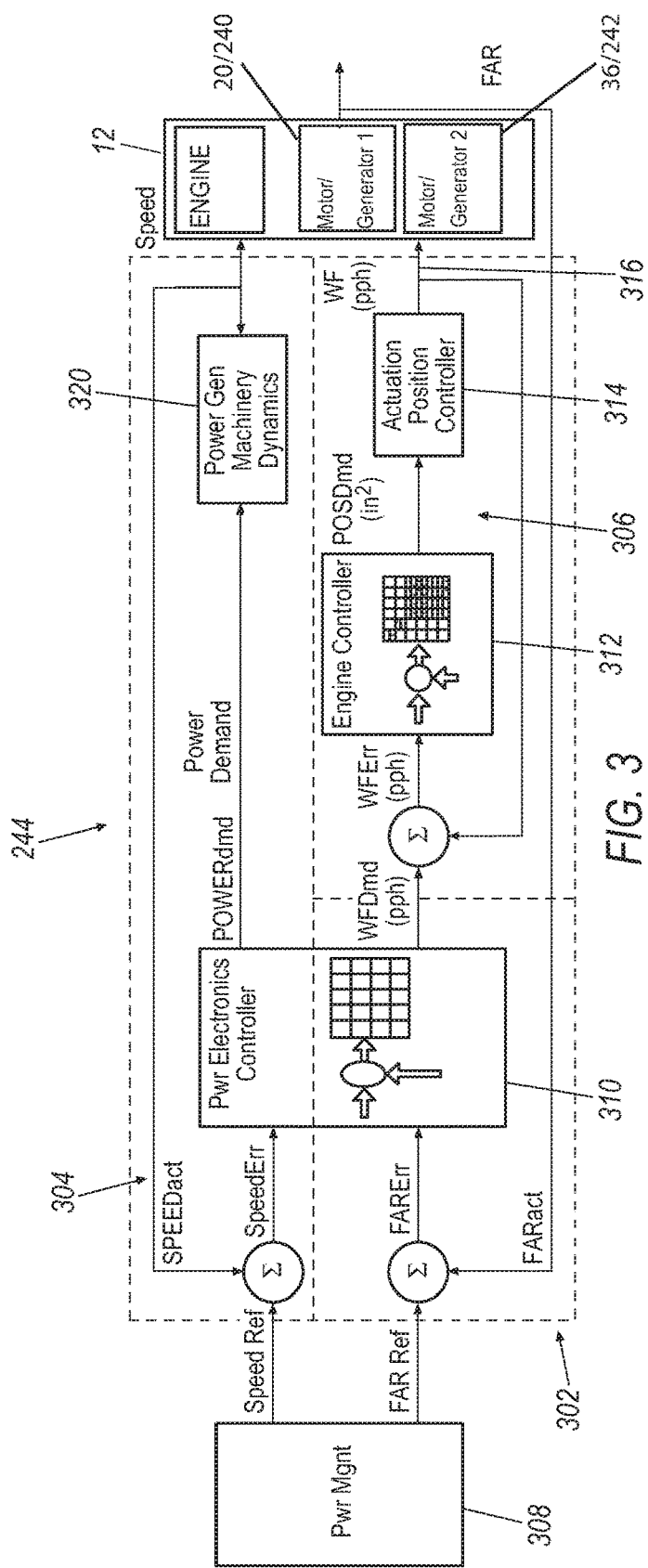
FIG. 3 is a schematic illustration of the fuel-air ratio control scheme for the system illustrated in FIG. 1.

FIG. 3 illustrates a fuel-air ratio controller architecture contemplated by the present disclosure. The controller 244 includes a fuel-air ratio control loop 302 and a motor/generator control loop 304 (also referred to as a speed control loop). In addition, within the fuel-air ratio control loop is a fuel flow control loop 306. A power management logic 308 is utilized to feed a fuel-air ratio demand signal (FARref) to the fuel-air ratio control loop 302 and a speed demand signal (SPEEDref) to the motor/generator control loop 304. The fuel-air ratio demand signal (FARref) is compared to a fuel-air ratio actual signal (FARact) to generate a fuel-air ratio error (FARerr). Similarly, the speed demand signal (SPEEDref) is compared to a speed actual signal (SPEEDact) to generate a speed error (SPEEDerr). The fuel-air ratio error (FARerr) and the speed error (SPEEDerr) are utilized by a multivariable logic control within a power electronics controller 310 to generate a fuel flow demand signal (WFdmd) and a power demand signal (POWERdmd).

The fuel flow control loop 306 compares the fuel flow demand signal (WFdmd) to a fuel flow actual signal (WFact) to generate a fuel flow error (WFerr). An engine controller 312 utilizes thus fuel flow error (WFerr) to generate a position demand signal (POSdmd). The position demand signal (POSdmd) is sent to an actuation position controller 314 which adjusts the fuel flow 316 into the engine/powerplant 12.

The motor/generator control loop 304 processes the speed error (SPEEDerr) using the multivariable logic control within the power electronics controller 310 to generate a power demand signal (POWERdmd). The power demand signal (POWERdmd) is utilized by the power generation machinery dynamics controller 320 to direct power either out of or into the first motor generator 240, the second motor generator 242 or both as will be explained in detail below. The described fuel-air ratio controller architecture would be understood by one skilled in the art, in light of the present disclosure, to be open to a variety of modifications, substitutions and alterations wherein a fuel-air ratio control loop 302 and a motor/generator control loop 304 that are utilized as described below.

The present disclosure contemplates utilizing the aforementioned architecture, or any equivalent structure, to control the flow of power to and from the first motor/generator 240 and/or the second motor/generator 242. Although the flow of power has been described as flowing in and out of an energy storage system 46, it is contemplated that the motor/generators 240, 242 may be connected to one or more platform electrical busses that utilize energy storage in the form of batteries, capacitors or other known systems. The motor/generators 240, 242 are connected to the fan shaft 217 and gas generator shaft 219 respectively. The power plant/engine 12, during normal operations, commonly moves between a steady state and either acceleration or deceleration. At steady state, the motor/generators 240, 242 operate in a steady state mode wherein they operate as standard generators supplying power to the energy storage system 46.

When the power plant/engine 12 experiences acceleration, the motor/generators 240, 242 switch from a steady state mode into a motor mode. In the motor mode, the motor/generators 240, 242 consume energy from the energy storage system 46 and operate to actively accelerate the fan shaft 217 such that air flow into the combustion chamber 208 is increased. As the acceleration demand decreases and the products of combustion carry the increased demand, the motor/generator 240, 242 will return to generator mode. In contrast, when the power plant/engine 12 experiences deceleration, the motor/generators 240, 242 will operate in a braking mode wherein a larger electrical power will be drawn out of them such that a braking torque on the fan shaft 217 or generator shaft 219 will cause the fan 202 to decelerate and the air flow into the combustion chamber 208 to decrease. Again, as the deceleration demand decreases the products of combustion will decrease the demand and the motor/generators 240, 242 will return to steady state mode.

In one embodiment of the present disclosure, during acceleration of the power plant/engine 12, power will be directed to the motor/generators 240, 242 to increase air flow prior to increasing fuel flow to the combustion chamber 208. This can reduce mean gas temperature spikes during acceleration and minimize combustor liner temperatures. This may result in improved combustor liner life and turbine inlet temperatures. Similarly, during decelerations the fuel flow may be reduced prior to drawing power from the motor/generators 240, 242 to decrease air flow. In addition, the active control of air flow due to routing power to and from the motor/generators 240, 242 allows for a more precise control of fuel-air ratio during accelerations and decelerations and therefore improves engine 12 efficiency. Applying positive and negative torques directly to the fan shaft 217 and/or the gas generator shaft 219 will increase engine 12 response times and particularly minimize over-fueling during accelerations. Finally the use of the electric motor/generators 240, 242 can be instrumental in the event of a shaft break. The described closed-loop fuel-air ratio control will decrease fuel flow in such a break to avoid over-speeds on the turbine. In addition, the electric motor/generators 240, 242 may be used to providing braking to a part of the broken shaft.

Although the electric motor/generators 240, 242 have been described as connected to the fan shaft 217 and the gas generator shaft 219 respectively, it would be understood that they may be connected or integrated in a variety of locations wherein they could provide the active motoring or braking necessary to affect the air flow into the combustion chamber 208. Similarly, one skilled in the art would understand, in light of the present disclosure that a variety of computing algorithms could be implemented in combination with the disclosed controls that could be utilized to further effect efficiency or performance of the engine 12.

Finally, when the present disclosure refers to computing devices such as system 10 it is contemplated that they generally include computer-executable instructions such as the instructions of the system controller 18, where the instructions may be executable by one or more computing devices such as those listed above. Computer-executable instructions may be compiled or interpreted from computer programs created using a variety of programming languages and/or technologies, including, without limitation, and either alone or in combination, Java™, C, C++, C#, Objective C, Visual Basic, Java Script, Perl, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random access memory (DRAM), which typically constitutes a main memory. Such instructions may be transmitted by one or more transmission media, including coaxial cables, copper wire and fiber optics, including the wires that comprise a system bus coupled to a processor of a computer. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claims.

All terms used in the claims are intended to be given their broadest reasonable constructions and their ordinary meanings as understood by those knowledgeable in the technologies described herein unless an explicit indication to the contrary in made herein. In particular, use of the singular articles such as "a," "the," "said," etc. should be read to recite one or more of the indicated elements unless a claim recites an explicit limitation to the contrary.

What is claimed is:

1. A turbine engine comprising:
    a fan connected to a fan shaft;
    a combustion chamber;
    a first electric motor/generator and a second electric motor/generator in a power sharing arrangement such that each is configured to provide a portion of a power demand while said first and second electric motors/generators are in communication with a power storage unit, at least one of said first and electric motors/generators being in communication with the fan shaft;
    a controller configured to direct power from the power storage unit to at least one of said first and second electric motor/generators during engine accelerations from steady state to generate an additional positive torque on the fan shaft such that air flow to said combustion chamber is increased; and
    said controller configured to direct power out of said first and second electric motors/generators to the power storage unit during engine decelerations from steady state to generate an additional negative torque on the fan shaft such that air flow to said combustion chamber is decreased, wherein one of the additional positive torque and the additional negative torque on the fan shaft is provided by way of said controller including a fuel-air ratio control loop and a motor/generator control loop, the motor/generator control loop generating a power demand signal based on a fuel-air ratio error of the fuel-air ratio control loop and a speed error of the motor/generator control loop, and the power demand signal selectively directing power to both of said first and second electric motors/generators.

2. A turbine engine as described in claim 1, wherein said controller is further configured to:

increase fuel flow to said combustion chamber during engine accelerations from steady state; and decrease fuel flow to said combustion chamber during engine decelerations from steady state;

wherein power is directed into said first and second electric motors/generators prior to increasing fuel flow during engine accelerations from steady state; and where fuel flow is decreased to said combustion chamber prior to directing power out of at least one of said first and second electric motors/generators during engine decelerations.

3. A turbine engine as described in claim 1, wherein said controller comprises a closed-loop control system wherein a speed demand signal is continually compared to a speed actual signal to calculate a power demand signal; and wherein said power demand signal is utilized to control the supply of power to at least one of said first and second electric motors/generators during engine accelerations from steady state; and wherein said power demand signal is utilized to retrieve power from at least one of said first and second electric motors/generators during engine decelerations from steady state.

4. A turbine engine as described in claim 1, further comprising:

wherein said controller directs power to at least one of said first and second electric motors/generators from said power storage unit during engine accelerations from steady state; and wherein said controller directs power away from at least one of said first and second electric motors/generators into said power storage unit during engine deceleration from steady state.

5. A turbine engine as described in claim 1, wherein said controller is configured to direct power away from at least one of said first and second electric motors/generators during engine decelerations from steady state such that at least one of said first and second electric motors/generators actively brakes said fan shaft.

6. A turbine engine as described in claim 1, wherein said controller is configured to direct power to at least one of said first and second electric motors/generators during engine accelerations from steady state such that at least one of said first and second electric motors/generators actively accelerates said fan shaft.

7. A turbine engine comprising:

a combustion chamber;
a gas generator shaft;
a controller; and
a first electric motor/generator and a second electric motor/generator in a power sharing arrangement such that each is configured to provide a portion of a power demand while being in communication with a power storage unit, at least one of said first and second electric motors/generators being in communication with said gas generator shaft;

said first electric motor/generator operable in a steady state mode, a motor mode, and a braking mode;

said first electric motor/generator operating in said steady state mode during engine constant speeds;

said first electric motor/generator operating in said motor mode during engine accelerations wherein power is directed from the power storage unit to said first electric motor/generator to generate an additional positive torque such that air flow to said combustion chamber is increased; and said first electric motor/generator operating in said braking mode during engine decelerations wherein power is directed out of said first electric motor/generator to the power storage unit to generate an additional negative torque such that air flow to said combustion chamber is decreased;

wherein said first electric motor/generator is moved between said steady state mode, said motor mode, and said braking mode to control a fuel-air-ratio to the engine, and wherein one of the additional positive torque and the additional negative torque on the gas generator shaft is provided by way of said controller including a fuel-air ratio control loop and a motor/generator control loop, the motor/generator control loop generating a power demand signal based on a fuel-air ratio error of the fuel-air ratio control loop and a speed error of the motor/generator control loop, and the power demand signal selectively directing power to both of said first and second electric motors/generators.

8. A turbine engine as described in claim 7, further comprising:

a low pressure shaft;
said second electric motor/generator in communication with said low pressure shaft;
said second electric motor/generator operable in a steady state mode, a motor mode, and a braking mode; and
wherein said second electric motor/generator and said first electric motor/generator operate in concert while using the power storage unit to selectively provide one of the additional positive torque and the additional negative torque.

9. A turbine engine as described in claim 7, further comprising:

a controller configured to:
increase fuel flow to said combustion chamber during engine accelerations; and
decrease fuel flow to said combustion chamber during engine decelerations.

10. A turbine engine as described in claim 9, wherein said controller is further configured to:

move said first electric/motor generator into said motor mode prior to increasing fuel flow during engine accelerations; and
move said first electric motor/generator into said braking mode after decreasing fuel flow to said combustion chamber during engine decelerations.

11. A turbine engine as described in claim 7, further comprising:

said controller including a closed-loop control system wherein a speed demand signal is continually compared to a speed actual signal to calculate a power demand signal; and wherein said power demand signal is utilized to move said first electric motor/generator between said steady state mode, said motor mode, and said braking mode to control the fuel-air-ratio to the engine.

12. A turbine engine as described in claim 7, further comprising:

wherein power is directed to said first electric motor/generator from said power storage unit when said first electric motor/generator is in said motor mode; and wherein power is directed out of said first electric motor/generator into said power storage unit when said first electric motor/generator is in said braking mode.

13. A turbine engine as described in claim 7, further comprising a fan connected to a low pressure shaft;

wherein said gas generator shaft is in communication with said low pressure shaft;

wherein said first electric motor/generator actively brakes said low pressure shaft when in said braking mode.

14. A turbine engine as described in claim 7, further comprising a fan connected to a low pressure shaft;

wherein said gas generator shaft is in communication with said low pressure shaft;

wherein said first electric motor/generator actively accelerates said low pressure shaft when in said motor mode.

15. A turbine engine comprising:

a fan connected to a fan shaft;

a combustion chamber;

a controller configured to monitor and control a fuel-air ratio fed into said combustion chamber while using first and second electric motors/generators in communication with a power storage unit to selectively provide one of an additional positive torque and an additional negative torque on the fan shaft, said controller including a closed-loop control system wherein a speed demand signal is continually compared to a speed actual signal to calculate a power demand signal;

wherein said power demand signal is utilized to control air flow into said combustion chamber to control said fuel-air ratio; and wherein one of the additional positive torque and the additional negative torque on the fan shaft is provided by way of said controller including a fuel-air ratio control loop and a motor/generator control loop, the motor/generator control loop generating a power demand signal based on a fuel-air ratio error of the fuel-air ratio control loop and a speed error of the motor/generator control loop, and the power demand signal selectively directing power to both of said first and second electric motors/generators.

16. A turbine engine as described in claim 15, further comprising:

said first electric motor/generator in communication with said fan shaft;

said first electric motor/generator operable in a steady state mode, a motor mode, and a braking mode;

said first electric motor/generator operating in said steady state mode during engine constant speeds;

said first electric motor/generator operating in said motor mode during engine accelerations, wherein power is directed from the power storage unit to said first electric motor/generator such that air flow to said combustion chamber is increased; and said first electric motor/generator operating in said braking mode during engine decelerations wherein power is directed out of said electric motor/generator to the power storage unit such that air flow to said combustion chamber is decreased;

said controller configured to move said first electric motor/generator between said steady state mode, said motor mode, and said braking mode in response to said power demand signal.

17. A turbine engine as described in claim 16, further comprising:

a gas turbine shaft;

said second electric motor/generator in communication with said gas turbine shaft;

said second electric motor/generator operable in a steady state mode, a motor mode, and a braking mode;

wherein said second electric motor/generator and said first electric motor/generator operate in concert while using the power storage unit to selectively provide one of the additional positive torque and the additional negative torque.

18. A turbine engine as described in claim 16, wherein said controller is further configured to:

increase fuel flow to said combustion chamber during engine accelerations; and decrease fuel flow to said combustion chamber during engine decelerations.

19. A turbine engine as described in claim 18, wherein said controller is further configured to:

move said first electric/motor generator into said motor mode prior to increasing fuel flow during engine accelerations; and move said first electric motor/generator into said braking mode after decreasing fuel flow to said combustion chamber during engine decelerations.

20. A turbine engine as described in claim 16, further comprising:

wherein power is directed to said first electric motor/generator from said power storage unit when said first electric motor/generator is in said motor mode; and wherein power is directed out of said first electric motor/generator into said power storage unit when said first electric motor/generator is in said braking mode.

* * * * *